United States Patent [19]

Merry

[11] 4,401,333
[45] Aug. 30, 1983

[54] PELICAN HOOK

[75] Inventor: Carl A. Merry, Marion, Mass.

[73] Assignee: Schaefer Marine, Inc., New Bedford, Mass.

[21] Appl. No.: 297,914

[22] Filed: Aug. 31, 1981

[51] Int. Cl.³ .......................... B66C 1/36; F16B 45/04
[52] U.S. Cl. ............................. 294/83 R; 24/241 PS; 24/241 SL
[58] Field of Search ................. 294/78 R, 82 R, 83 R, 294/84, 75; 24/232 R, 233–235, 238, 239, 241 R, 241 P, 241 PL, 241 PS, 241 S, 241 SL, 241 SP; 114/108, 113

[56] References Cited

U.S. PATENT DOCUMENTS

| | | | |
|---|---|---|---|
| 827,795 | 8/1906 | Foucher | 294/83 R |
| 967,141 | 8/1910 | Merriman | 24/241 PS |
| 1,303,033 | 5/1919 | Coulter | 294/83 R |
| 1,386,561 | 8/1921 | Foster | 24/241 SL |
| 1,605,799 | 11/1926 | Ver Valen | 24/241 SL |
| 2,276,628 | 3/1942 | Quilter | 24/241 PS |
| 3,850,468 | 11/1974 | Hultin | 294/83 R |
| 3,938,844 | 2/1976 | Johnson | 294/83 R |
| 4,152,814 | 5/1979 | Ito | 24/241 PS |

Primary Examiner—Johnny D. Cherry
Attorney, Agent, or Firm—Cesari and McKenna

[57] ABSTRACT

A pelican hook employs two locks for locking the hook arm in its closed position against the main body of the hook. One lock consists of a retractable spring-loaded locking pin which extends obliquely through the main body and into a passage in the arm when the arm is in its closed position. The other lock is a spring-loaded retractable sleeve slidably mounted on the main body. The sleeve is biased to a reference position on the main body wherein it encircles the free end of the arm when the arm is in its closed position and is retractable to a position beyond the arm end. In order to open the hook, both locks must be retracted in different directions simultaneously.

3 Claims, 4 Drawing Figures

PELICAN HOOK

This invention relates to an item of marine hardware. It relates more particularly to an improved pelican hook for use especially on watercraft.

BACKGROUND OF THE INVENTION

A Pelican hook is a marine fitting used to removably secure the end of a line or cable to an anchoring point. For example, such a fitting is often employed to connect the end of a lifeline, which lifeline extends around the perimeter of a boat deck, to a stanchion to enable that end to be disconnected in the event that becomes necessary for one reason or another.

The pelican hook usually comprises a more or less straight main body, one end of which has an opening which is internally threaded to receive a threaded shank connected to the line to be secured. The hook also includes a hook-like arm having more or less the shape of an inverted letter J. The curved end segment of the arm is hinged to the free end of the main body so that the arm can be swung between an open position wherein its straight segment is positioned away from the main body and a closed position wherein the straight segment of the arm lies flush against the main body and an eye is formed at the end of the hook.

Usually also, means are provided for locking the arm in its closed position. To applicant's knowledge, these means take one of two forms. A spring-loaded retractable locking pin is mounted through the main body of the hook so that one end of the pin extends through a passage in the arm when the arm is in its closed position and the other end of the pin projects from the main body opposite the arm and functions as a handle. When the hook arm is in its closed position and the pin is in its normal extended position, the pin projects into the passage in the arm, thereby locking the arm in its closed position. On the other hand, when the pin is in its retracted position, its end adjacent the arm is retracted into the main body permitting the arm to swing outward on its hinge to the main body.

In the other type of hook, the arm is releasably locked in its closed position by a U-shaped hasp which is pivotally connected to the main body so that it can be swung between a position wherein the hasp engages around the free end of the arm when that arm is in its closed position and a releasing position wherein it is swung away from the arm permitting the arm to swing away from the main body.

The prior pelican hooks of this general type have not been entirely satisfactory, however. This is because in the first type hook, the handle of the spring loaded plunger terminates in a fixed eye which projects from the pelican hook body. This eye sometimes gets caught on moving lines or on the wearing apparel of a passerby so that the plunger is inadvertently retracted, thereby releasing the hook arm. The other type pelican hook employing a hasp to lock the hook arm is disadvantaged because it is relatively difficult to release.

Most importantly, however, both conventional pelican hooks are not as safe and reliable as they might be because only one lock is used to secure the hook arm in its closed position. If that lock fails or is released inadvertently, the pelican hook arm can swing open, thereby releasing the hook from its anchoring point. Such inadvertent release can have disastrous consequences if, for example, the pelican hook is being used to anchor a lifeline or other comparable line or cable.

SUMMARY OF THE INVENTION

Accordingly, the present invention aims to provide a pelican hook which is especially safe to use.

Another object of the invention is to provide such a hook which is relatively immune to inadvertent release.

A further object of the invention is to provide a pelican hook which is especially strong, rugged and reliable.

Another object of the invention is to provide a pelican hook which has a minimum number of promontories or projections which can catch on or be caught by nearby moving objects.

Other objects will, in part, be obvious and will, in part, appear hereinafter.

The invention accordingly, comprises the features of construction, combination of elements and arrangement of parts which will be exemplified in the following detailed description, and the scope of the invention will be indicated in the claims.

Briefly, the present hook comprises an elongated, generally straight main body having an internally threaded nut formed at one end for receiving the threaded end of an elongated shank. The opposite end of the shank terminates in a swaging stud which can be connected to any suitable line or cable.

A hook-like arm in the shape of an inverted letter J has its curved end pivotally connected to the free end of the main body. This permits the arm to be swung between an open position wherein it is swung away from the main body so that the arm can be engaged through a hasp or other type of eye and a closed position wherein the arm is swung against the main body thereby to form a closed loop for capturing the hasp at the end of the pelican hook.

The present hook also has the usual spring-loaded retractable pin extending obliquely through the main body. When the arms is in its closed position and the pin is in its normal extended position, the pin projects through a passage in the arm, thereby locking the arm in its closed position. As usual, the arm is released by retracting the pin.

In addition, however, a second, completely independent lock is included on the pelican hook to lock the arm in its closed position. The second lock takes the form of a generally cylindrical spring-loaded retractable locking sleeve which is slidably mounted on the main body of the hook at the point on that main body where the arm terminates when the arm is in its closed position. The sleeve is movable between an extended position wherein it engages around and captures the end of the hook arm and a retracted position wherein it is retracted away from the arm permitting the arm to swing out on its pivotal connection to the main body. The sleeve is biased toward its extended position so that, when the hook arm is swung closed, it is normally locked in place not only by the locking pin but also by the locking sleeve.

Thus, in order to release the pelican hook, two completely different and independent motions are required. Not only must the pin be retracted in a direction more or less perpendicular to the hook main body, but also the sleeve must be retracted in a direction parallel to the main body. Furthermore, both of these retracting motions must take place simultaneously in order to open the hook. Accordingly, it is next to impossible for the hook to be released inadvertently.

The present pelican hook is advantaged also in that it has no protrusions or projections that can become caught on nearby moving objects. Yet, despite all of these advantages, the cost of making the hook should not be appreciably more than that required to fabricate conventional hooks of this general type.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
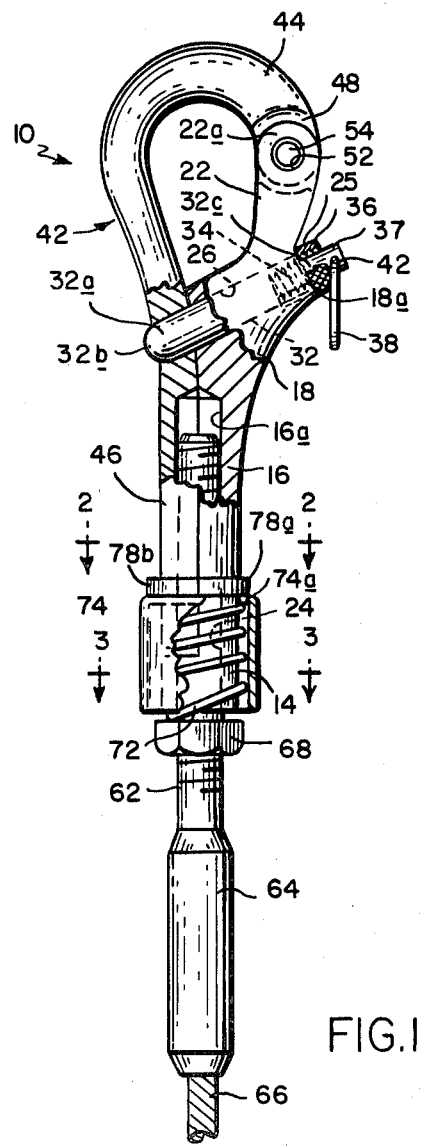
FIG. 1 is an elevational view with parts broken away of a pelican hook embodying the principles of this invention, with the pelican hook being shown in its closed position.
Figure 2:
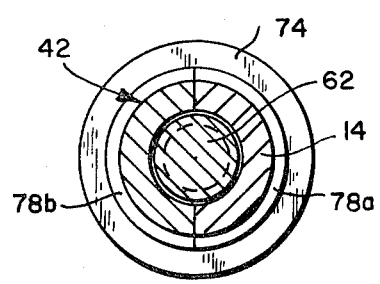
FIG. 2 is a sectional view along line 2—2 of FIG. 1.
Figure 3:
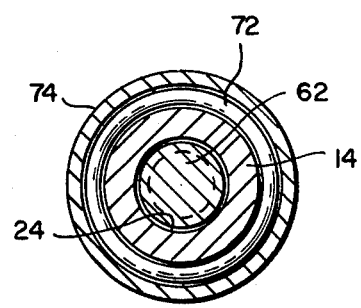
FIG. 3 is a sectional view along line 3—3 of FIG. 1.

Referring to FIGS. 1 to 3 of the drawing, my improved pelican hook is indicated generally at 10. It comprises an elongated main body 12. The body 12 has a generally cylindrical lower segment 14, a longer intermediate semi-cylindrical segment 16 and an upper outwardly-flared segment 18 which terminates in an upwardly extending projection 22. The body segment 14 is provided with an axial passage 24 whose circumference coincides with the channel 16a of the semi-cylindrical segment 16. Also, the passage 24 is threaded.

As best seen in FIG. 1, the flared segment 18 is formed with an oblique shelf 18a at the base of projection 22 and an externally threaded collar 25 projects out from that shelf. A passage 26 extends through collar 25 at an obtuse angle to the longitudinal axis of the segment 18 all the way through that segment so that the opposite end of that passage is situated directly above the segment channel 16a.

Slidably positioned in passage 26 is an elongated, generally cylindrical locking pin or plunger 32. Pin 32 has a relatively long barrel 32a the lower end of which terminates in a rounded end 32b. The diameter of the barrel is slightly less than the passage 26 so that the barrel slides freely in the passage. The upper end of the barrel connects to a smaller diameter neck segment 32c which projects out beyond collar 25. A coil spring 34 is engaged around the neck segment 32c inside passage 26 and an internally threaded nut 36 having a central opening 37 which receives segement 32c is screwed onto the upper end of collar 25. A ring 38 engaged through an opening 42 at the upper end of the neck segment limits the extension of the pin through the passage 26.

When the nut 36 is turned down onto the threaded collar 25, the spring 34 is compressed, thereby urging the pin 32 to an extended position wherein the ring 38 engages nut 36 and the rounded end 32a of the barrel projects out through the lower end of passage 26 and beyond main body 12. The engagement of the ring 38 on the nut 36 prevents the pin 32 from sliding completely out of the housing. By pulling on the ring 38, the pin 32 can be retracted so that the barrel rounded end 32b is situated inside the lower end of passage 26. Instead of relying on ring 38 to limit the extension of pin 32, the lower end of passage 26 and an adjacent segment of barrel can be necked down or stepped to limit the downward travel of the pin.

Referring to FIGS. 1 and 2, the pelican hook 10 also includes a hook-shaped arm 42 having the general shape of an inverted letter J. The arm has a rounded end segment 44 and a relatively straight semi-cylindrical end segment 46. The free end of segment 44 is laterally flattened to form a tab 48 which fits between a pair of upstanding laterally spaced-apart ears 22a projecting up from the free end of the main body projection 22. Registering openings 52 are formed through the ears and the tab and a pin 54 is inserted through those openings with its ends upset so that the pin is permanently retained there. Thus the arm 42 is free to swing relative to main body 12 with the pin 54 functioning as a pivot.

Figure 4:
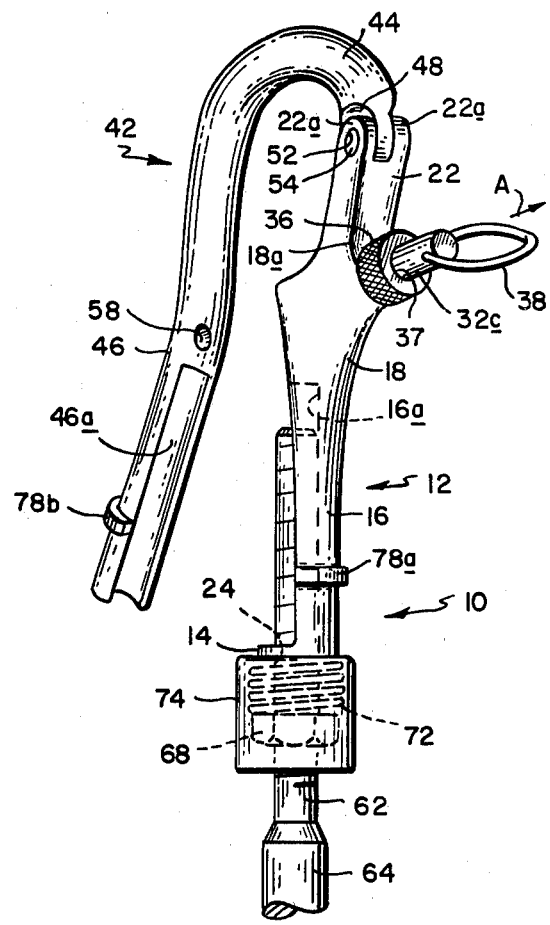
FIG. 4 is an isometric view illustrating the pelican hook in its open position.

Arm 42 can swing relative to main body from an open position illustrated in FIG. 4 wherein its lower, relatively straight end segment 46 is spaced away from the main body to a closed position shown in FIG. 1 wherein the end segment 46 engages the semi-cylindrical main body segment 16 forming a closed loop at the end of hook 10. Of course, to enable the arm to reach its closed position, its lower end terminates just above the body segment 14 as best shown in FIG. 1.

When the arm 42 is in its closed position, its semi-cylindrical segment channel 46a is disposed directly opposite the main body segment channel 16a and defines therewith a cylindrical passage which is essentially an extension of the passage 24 through the main body segment 14. A passage 58 is formed through arm 42 at the boundary between its segments 44 and 46. Passage 58 is oriented and positioned so that, when the arm is in its closed position shown in FIG. 1, the passage 58 is aligned with the main body passage 26 so that the pin barrel 32a can project into that passage. Since the passages 26 and 58 are downwardly angled as shown in FIG. 1, when the pin 32 is in its extended position, it securely locks the arm 42 in its closed position against body 12. On the other hand, when the pin 32 is retracted by pulling ring 38 in the direction of arrow A as illustrated in FIG. 4, the pin barrel is withdrawn from the passage 58 so that the arm is free to swing away from body 12 as seen in that figure. When the ring 38 is not being pulled, it swings down to an out-of-the-way position shown in FIG. 1 so that it is not in a position to be caught and pulled by nearby moving objects.

Referring now to FIGS. 1 and 3, the pelican hook also includes an elongated threaded shank 62 which is threadedly received in the threaded opening 24 in the body segment 14. The lower end of the shank 62 terminates in a swaging stud 64 to which is anchored a standard line or cable 66. The threaded shank is relatively long so that it can be turned into the pelican hook body 12 by different amounts thereby to adjust the distance between the hook and line 66. The semi-cylindrical channels 16a and 46a in main body 12 and arm 42 respectively permit a considerable amount of lengthwise travel of the shank relative to the body 12.

Prior to screwing the shank into the body 12, a nut 68 is turned down onto the shank and a coiled compression spring 72 is engaged over the shank so that it rests on the nut 68. Then a locking sleeve 74 is engaged over the spring. The lower end of the sleeve is open. However, the upper end of the sleeve has a reduced diameter neck opening 74a which is slightly smaller than the outer diameter of the spring so that the spring is captured between the locking sleeve and the nut 68. Finally, the pelican hook body 12 is screwed down onto the shank 62 with its cylindrical segment 14 extending through the spring 72 and the sleeve 74 as shown in FIG. 1. Semi-circular mating flange segments 78a and 78b are formed on the main body segment 16 and the arm segment 46. These flanges are spaced above the lower end of the arm 42 when the arm is in its closed position to function as a stop for the sleeve 74 to limit its upward travel. Of course, nut 68 is adjustably positioned on the shank so that spring 72 is compressed to exert a strong biasing force on the sleeve to normally maintain the sleeve in its extended position shown in FIG. 1.

When the locking sleeve is in its extended position illustrated in FIG. 1, it encircles the lower end of the arm 42. Consequently, that arm cannot be swung out to its open position even though the pin 32 should be in its retracted position or break for one reason or another. Rather, in order to release the arm, the sleeve 74 must be slid to its retracted position illustrated in FIG. 4 so that it resides below the lower end of arm 42 permitting the arm to be swung out away from body 12. Of course, the nut 68 is sized to permit the sleeve to retract over the nut as shown in that figure. By the same token, if the sleeve should be retracted inadvertently, the hook will still not release because its arm is still locked by pin 32.

As a practical matter, then, two independent locking mechanisms must be released in order to open the pelican hook. That is, the pin 32 must be retracted and the locking sleeve 74 must be retracted at one and the same time. Since the retractions occur in different directions, as a practical matter, two hands are required to open the hook. Accordingly, it is highly unlikely that the hook will be released inadvertently.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. In a pelican hook of the type having an elongated rigid main body, a rigid hook-shaped arm having a curved end segment and a relatively straight end segment, a pivot pivotally connecting the free end of the curved arm segment to one end of the main body so that the arm can swing between an open position wherein the straight arm segment is positioned away from the main body and a closed position wherein the straight arm segment lies flush against the main body thereby defining a closed loop at the end of the hook, a retractable spring-loaded locking pin extending obliquely through the main body, and a passage in the arm which, when the arm is in its closed position, is aligned with the pin so that the pin is biased into the passage so as to lock the arm in its closed position characterized in that
   A. a locking sleeve encircles the opposite end of the main body and is slidable therealong;
   B. stop means are provided on the main body for establishing a reference position for the sleeve relative to the main body at which the sleeve engages around the free end of the straight arm segment when the arm is in its closed position;
   C. means are provided for biasing the locking sleeve toward its reference position, said sleeve being retractable along the main body in opposition to the biasing means beyond the free end of the straight arm segment, said biasing means comprising
      (1) a nut threadedly engaged on the stud adjacent said opposite end of the main body, said nut having a smaller diameter than the inside diameter of the sleeve; and
      (2) a coil spring encircling the main body opposite end inside the sleeve, said spring being compressed between the nut and a portion of the sleeve;
   D. said locking pin and said locking sleeve have to be retracted simultaneously in different directions in order to release the arm so that the arm can swing to its open position, and
   E. an elongated rigid stud is threadedly engaged in the main body.

2. The pelican hook defined in claim 1 and further including a rigid ring hinged to an exposed end of the locking pin to facilitate its retraction.

3. The pelican hook defined in claim 1 wherein the stop means comprise a radially outwardly extending semi-circular flange formed on said main body.

* * * * *